(12) United States Patent
Ikeda et al.

(10) Patent No.: US 6,996,309 B2
(45) Date of Patent: Feb. 7, 2006

(54) OPTICAL SIGNAL PROCESSOR

(75) Inventors: Yuji Ikeda, Mitaka (JP); Michiko Takushima, Yokohama (JP); Tomomi Sano, Yokohama (JP); Yoshikazu Kanai, Mitaka (JP)

(73) Assignees: Sumitomo Electric Industries, Ltd., Osaka (JP); Genesia Corporation, Tokyo (JP)

( * ) Notice: Subject to any disclaimer, the term of this patent is extended or adjusted under 35 U.S.C. 154(b) by 68 days.

(21) Appl. No.: 10/927,502

(22) Filed: Aug. 27, 2004

(65) Prior Publication Data

US 2005/0063702 A1    Mar. 24, 2005

Related U.S. Application Data

(60) Provisional application No. 60/498,584, filed on Aug. 29, 2003.

(30) Foreign Application Priority Data

Aug. 29, 2003  (JP)  ............................ P2003-306292

(51) Int. Cl.
  *G02B 6/26*   (2006.01)
  *G02B 27/44*  (2006.01)
  *G22B 6/28*   (2006.01)
  *G02F 1/00*   (2006.01)
  *H04J 14/00*  (2006.01)

(52) U.S. Cl. ..................... 385/24; 385/47; 385/147; 398/45; 398/115

(58) Field of Classification Search ............... 385/14, 385/16, 18, 24, 47, 31, 39, 147; 398/115, 398/118, 124, 42–45, 47, 79; 359/868, 869, 359/10, 11, 27
See application file for complete search history.

(56) References Cited

U.S. PATENT DOCUMENTS

| | | | | |
|---|---|---|---|---|
| 5,416,616 | A  * | 5/1995  | Jenkins et al. | ................ 359/11 |
| 6,122,419 | A  * | 9/2000  | Kurokawa et al. | ............ 385/31 |
| 6,445,470 | B1 * | 9/2002  | Jenkins et al. | ................ 359/11 |
| 6,453,087 | B2 * | 9/2002  | Frish et al. | .................... 385/24 |
| 6,786,611 | B2 * | 9/2004  | Cao et al. | .................... 359/868 |
| 2003/0128917 | A1 * | 7/2003 | Turpin et al. | ................. 385/24 |
| 2003/0228108 | A1 * | 12/2003 | Takushima et al. | ........... 385/47 |
| 2004/0076368 | A1 * | 4/2004 | Takushima et al. | ........... 385/18 |

FOREIGN PATENT DOCUMENTS

JP    2002-303805    10/2002

* cited by examiner

*Primary Examiner*—Akm Enayet Ullah
(74) *Attorney, Agent, or Firm*—McDermott Will & Emery LLP

(57) ABSTRACT

In an incoming path, light fed to an input port is demultiplexed by a wavelength demultiplexer in terms of wavelength, converged by a first light-converging optical system, reflected by a first reflecting mirror, turned into parallel light by the first light-converging optical system, and multiplexed by the wavelength demultiplexer, so as to be fed to a reflecting surface of a rectangular reflecting mirror. In an outgoing path, the light reflected by the rectangular reflecting mirror is demultiplexed by the wavelength demultiplexer in terms of wavelengths, converged by the first light-converging optical system, reflected by the first reflecting mirror, turned into parallel light by the first light-converging optical system, and multiplexed by the wavelength demultiplexer, so as to be fed to an output port. An image of each wavelength light component reflected by the first reflecting mirror is inverted between the incoming and outgoing paths.

13 Claims, 9 Drawing Sheets

Fig.2
(a)
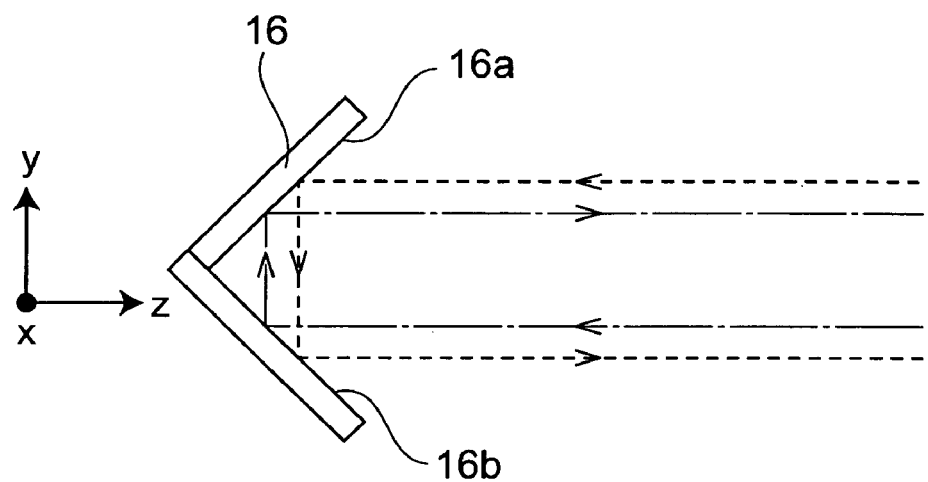
(b)
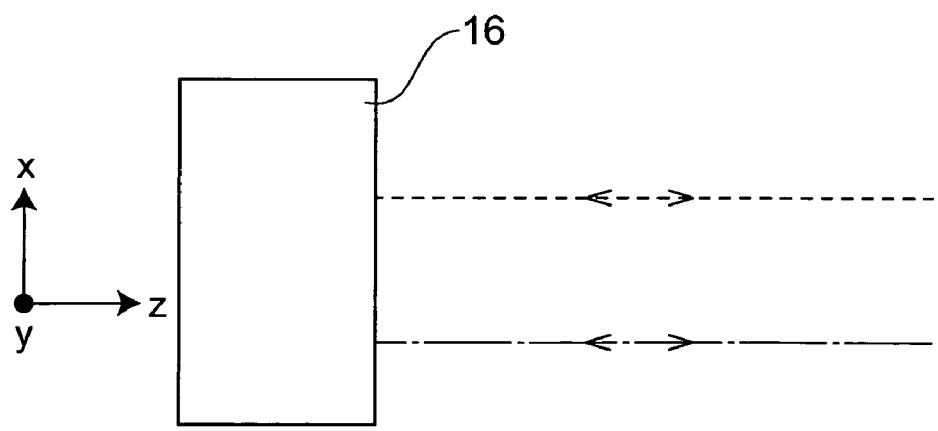

Fig.3
(a)
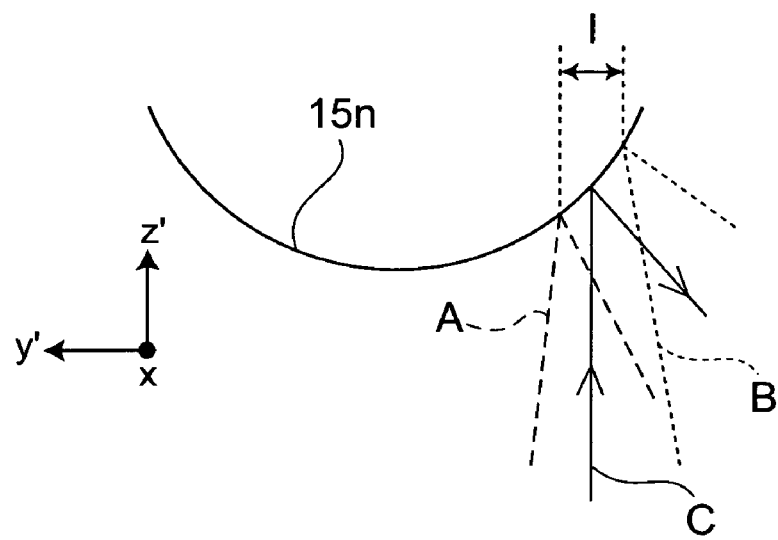
(b)
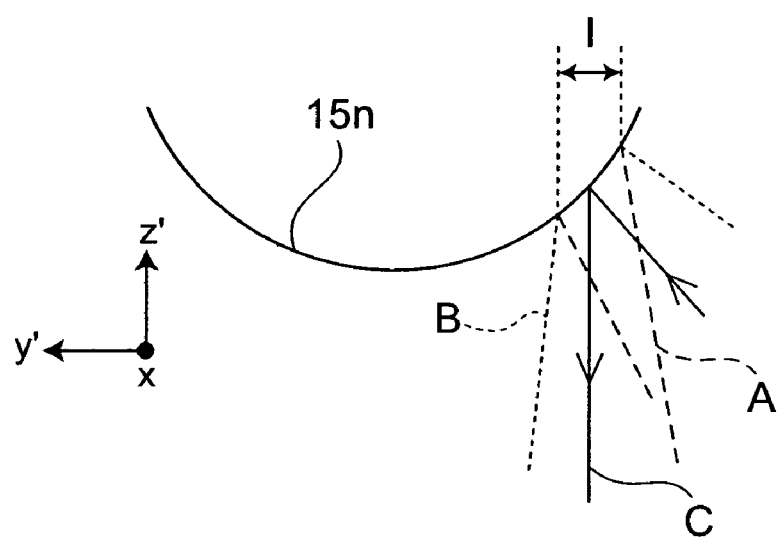

OPTICAL SIGNAL PROCESSOR

CROSS-REFERENCE TO RELATED APPLICATION

This application claims priority to Provisional Application Ser. No. 60/498,584 filed on Aug. 29, 2003 which is hereby incorporated by reference in their entirety.

BACKGROUND OF THE INVENTION

1. Field of the Invention

The present invention relates to an optical signal processor which processes light fed to an input port according to a wavelength of the light and then outputs the light from an output port.

2. Related Background of the Invention

An optical signal processor is equipped with a wavelength demultiplexer, which demultiplexes light in terms of wavelengths, and processes individual wavelengths of light demultiplexed in terms of wavelengths. An example of such an optical signal processor is a dispersion compensator which adjusts the chromatic dispersion of light according to the wavelength thereof (see, for example, Patent Document 1: Japanese Patent Application Laid-Open No. 2002-303805).

The optical signal processor (dispersion compensator) disclosed in Patent Document 1 can favorably be used for compensating for the chromatic dispersion of signal light in an optical communication system. In the optical signal processor, light to be subjected to dispersion compensation is inputted, and then is demultiplexed by a wavelength demultiplexer in terms of wavelengths. Thus wavelength-demultiplexed light components are reflected by a reflecting mirror, so as to be multiplexed by and outputted from the wavelength demultiplexer. Here, wavelength light components different from each other are incident on respective positions on the reflecting surface of the reflecting mirror. Since the reflecting surface is curved, respective group delay times corresponding to the wavelengths are provided according to the wavelengths at the time of reflection, whereby the chromatic dispersion of light is adjusted.

SUMMARY OF THE INVENTION

When used in an optical communication system, the above-mentioned optical signal processor inputs light outputted from an end face of an optical fiber, and outputs the processed light to an end face of an optical fiber. Since light is divergently outputted from an end face of an optical fiber, it is necessary that the divergent light be fed as parallel light to the wavelength demultiplexer by a light-converging optical system, and that the individual light components wavelength-demultiplexed by the wavelength demultiplexer be converged by another light-converging optical system, so as to be fed to the reflecting mirror.

When the light outputted from an end face of an optical fiber is fed to a signal processor as such, the individual wavelength light components converged by the light-converging optical system disposed downstream the wavelength demultiplexer are not converged at an ideal point as in the case of light inputted from a point light source, but into an area corresponding to the mode field diameter of the optical fiber or greater in general. Therefore, even when a desirable group delay time is given to a wavelength light component at the center position of the light-converging area, the group delay time given to the wavelength light component at a position located far from the center position within the light-converging area differs from the desirable value.

For overcoming the problem mentioned above, it is an object of the present invention to provide an optical signal processor which can reduce errors in processing even when inputting and processing light outputted from an end face of an optical fiber.

The present invention provides an optical signal processor for processing a Gaussian beam light fed to an input port according to a wavelength thereof and then outputting the processed light from an output port; the optical signal processor comprising (1) a wavelength demultiplexer for spatially demultiplexing the inputted light in terms of wavelengths and outputting demultiplexed wavelength light components into respective optical paths different from each other; (2) a first light-converging optical system for converging the wavelength light components outputted from the wavelength demultiplexer; (3) a first reflecting mirror having a reflecting surface at a position where the light components are converged by the first light-converging optical system and causing the reflecting surface to reflect the wavelength light components converged by the first light-converging optical system such that the reflected light components are fed into the first light-converging optical system; and (4) optical path turning means for inputting light arriving by way of the wavelength demultiplexer, first light-converging optical system, first reflecting mirror, first light-converging optical system, and wavelength demultiplexer in succession after being fed into the input port, and turning an optical path of the light such that the light travels the wavelength demultiplexer, first light-converging optical system, first reflecting mirror, first light-converging optical system, and wavelength demultiplexer in succession so as to be outputted from the output port.

The optical path turning means inverts an image of each wavelength light component reflected by the first reflecting mirror between an incoming optical path from the input port to the optical path turning means and an outgoing optical path from the optical path turning means to the output port. Here, "inverting an image of each wavelength light component reflected by the first reflecting mirror" means that, when a predetermined axis, which is perpendicular to a direction in which the wavelength light components demultiplexed by the wavelength demultiplexer in terms of wavelengths are arranged, is set on the first reflecting mirror, respective images of each wavelength light component in the incoming path and outgoing path are symmetrical about the predetermined axis or a point on the predetermined axis.

In the optical signal processor, the light fed to the input port is spatially demultiplexed in terms of wavelengths by the wavelength demultiplexer. The wavelength demultiplexed light components are outputted from the wavelength demultiplexer to respective optical paths different from each other, converged by the first light-converging optical system, and then reflected by the first reflecting mirror, so as to be fed into the optical path turning means by way of the first light-converging optical system and wavelength demultiplexer, whereby the optical paths are turned by the optical path turning means. With the optical paths turned by the optical path turning means, the light components travel the wavelength demultiplexer, first light-converging optical system, first reflecting mirror, first light-converging optical system, and wavelength demultiplexer in succession, so as to be outputted from the output port. The image of each wavelength light component reflected by the first reflecting mirror is inverted between the incoming optical path from the input port to the optical path turning means and the outgoing optical path from the optical path turning means to the output port. As a consequence, the optical signal processor in accordance with the present invention can reduce errors in processing.

Preferably, in the optical signal processor in accordance with the present invention, the wavelength demultiplexer is a diffraction grating element. Preferably, the reflecting surface of the first reflecting mirror is movable. Preferably, the reflecting surface of the first reflecting mirror is curved. Preferably, the reflecting surface of the first reflecting mirror has a variable curvature.

In the present invention, the first reflecting mirror may include a plurality of reflecting mirrors for reflecting respective wavelength light components converged by the first light-converging optical system. In this configuration, the optical signal processor further comprises a plurality of mirror driving parts for driving the respective reflecting mirrors. Each of the plurality of mirror driving parts comprises movable electrodes and stationary electrodes. The movable electrodes are disposed on both sides of their corresponding reflecting mirror in a direction in which wavelengths of incident light are distributed. The movable electrodes extend in a direction intersecting the reflecting mirror. The stationary electrodes are disposed so as to face the respective movable electrodes. Each of the plurality of reflecting mirrors is fixed in a part extending along a center axis intersecting the above-mentioned direction (in which wavelengths of incident light are distributed), and is curved by a voltage applied between the movable and stationary electrodes. In this configuration, the curvature of each of the plurality of reflecting mirrors can be regulated when the voltage applied between the movable and stationary electrodes is set arbitrarily. This can compensate for the dispersion of each of the wavelength light components fed to the plurality of reflecting mirrors.

In the present invention, the first reflecting mirror may have a reflectance arbitrarily set for each position where the respective wavelength light component converged by the first light-converging optical system is incident. In this case, the first reflecting mirror is provided with a film containing gold, the film having a thickness set according to the reflectance set for each position. This configuration allows the light incident on the first reflecting mirror to be reflected at given gains for the respective wavelength components.

Preferably, in the optical signal processor in accordance with the present invention, the optical path turning means inputs and reflects the light arriving by way of the incoming path, so that thus reflected light is outputted to the outgoing path identical to the incoming path.

Preferably, in the optical signal processor in accordance with the present invention, the optical path turning means has first and second reflecting surfaces orthogonal to each other, and causes the first and second reflecting surfaces to successively reflect the light arriving by way of the incoming path, so as to output the light to the outgoing path. In this case, it will be preferred if the optical path turning means includes a prism having two surfaces orthogonal to each other as the first and second reflecting surfaces.

Preferably, in the optical signal processor in accordance with the present invention, the optical path turning means has first, second, and third reflecting surfaces orthogonal to each other, and causes the first, second, and third reflecting surfaces to successively reflect the light arriving by way of the incoming path, so as to output the light to the outgoing path. In this case, it will be preferred if the optical path turning means includes a corner cube prism having three surfaces orthogonal to each other as the first, second, and third reflecting surfaces.

BRIEF DESCRIPTION OF THE DRAWINGS

FIG. 2 is a view for explaining the reflection of light in a rectangular reflecting mirror in the optical signal processor in accordance with the embodiment of the present invention;

FIG. 3 is a view for explaining respective reflections of light in a reflecting mirror in the optical signal processor in accordance with the embodiment of the present invention;

DESCRIPTION OF THE PREFERRED EMBODIMENTS

In the following, best modes for carrying out the present invention will be explained in detail with reference to the accompanying drawings. In the explanation of the drawings, constituents identical to each other will be referred to with numerals identical to each other without repeating their overlapping descriptions. In some drawings, xyz and xy'z' orthogonal coordinate systems are illustrated for convenience of explanation.

Figure 1:
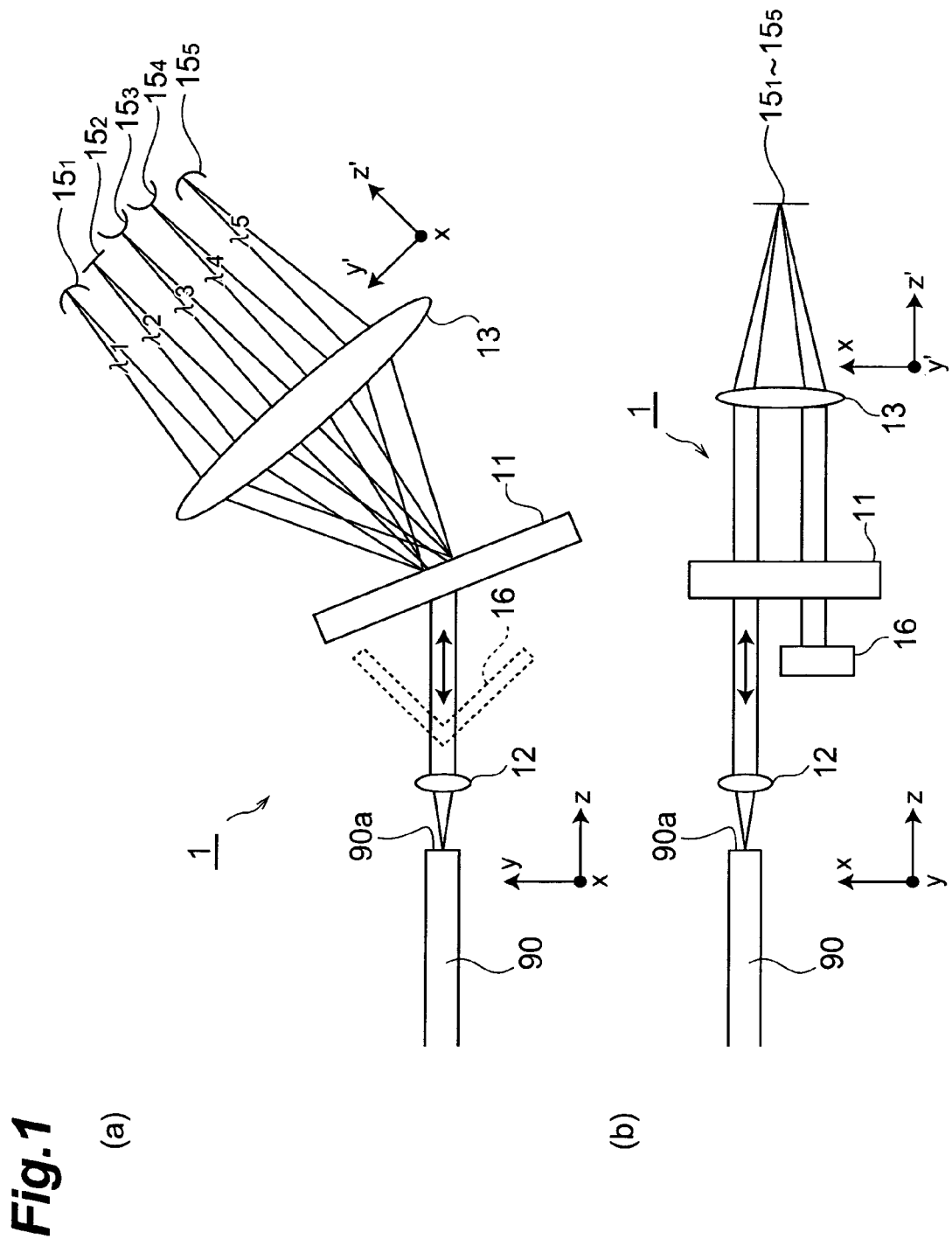
FIG. 1 is a view showing the configuration of an optical signal processor in accordance with an embodiment of the present invention.

FIG. 1 is a view showing the configuration of the optical signal processor in accordance with an embodiment of the present invention. The optical signal processor 1 shown in FIG. 1 comprises a diffraction grating element 11, lenses 12 and 13, reflecting mirrors $15_1$ to $15_5$, and a rectangular reflecting mirror 16, and is used together with an optical fiber 90. FIG. 1(a) is a view showing the optical signal processor 1 as seen in the x-axis direction, whereas FIG. 1(b) is a view in which the optical signal processor 1 is seen in the y-axis direction between the optical fiber 90 and the diffraction grating element 11 and in the y'-axis direction between the diffraction grating element 11 and the reflecting mirrors $15_1$ to $15_5$. Between the optical fiber 90 and the diffraction grating element 11, the z axis is set parallel to the optical axis of the lens 12 therebetween. Between the diffraction grating element 11 and the reflecting mirrors $15_1$ to $15_5$, the z' axis is set parallel to the optical axis of the lens 13 therebetween.

The optical signal processor 1 has input and output ports both positioned at an end face 90a of the optical fiber 90, whereby a Gaussian beam light outputted from the end face 90a of the optical fiber 90 is fed into the input port, thus inputted light is processed according to wavelengths thereof, and then the processed light is outputted from the output port, so as to be fed to the end face 90a of the optical fiber 90.

The light (divergent light) outputted from the end face 90a of the optical fiber 90 so as to be fed into the input port is collimated by the lens 12 so as to become parallel light, which is then fed to the diffraction grating element 11. Also, the parallel light arriving from the diffraction grating element 11 is converged at the position of the end face 90a of the optical fiber 90 by the lens 12, and thus converged light is outputted from the output port, so as to be fed to the end face 90a of the optical fiber 90. The light advances in the z-axis direction between the end face 90a of the optical fiber 90 and the diffraction grating element 11.

The diffraction grating element 11 is a transmission type diffraction grating element, and acts as a wavelength demultiplexer which spatially demultiplexes inputted light in terms of wavelengths and outputs the individual wavelength light components to respective optical paths different from each other. Namely, the diffraction grating element 11 inputs the parallel light arriving from the lens 12, demultiplexes the light spatially in terms of wavelengths, and outputs the wavelength demultiplexed light components to respective optical paths different from each other toward the lens 13. Gratings in the diffraction grating element 11 extend in the x-axis direction, whereby wavelength light components advance in parallel with the y'z' plane between the diffraction grating element 11 and the lens 13. In this embodiment, the light outputted from the end face of the optical fiber 90 includes signal light components having respective center wavelengths $\lambda_1$ to $\lambda_5$, whereas the diffraction grating element 11 spatially demultiplexes these five wavelengths of signal light in terms of wavelengths.

The lens 13 acts as a first light-converging optical system which converges the individual wavelength light components outputted after being demultiplexed in terms of wavelengths by the diffraction grating element 11. Namely, onto the reflecting surfaces of the reflecting mirrors $15_1$ to $15_5$, the lens 13 converges light components having center wavelengths $\lambda_1$ to $\lambda_5$ outputted after being demultiplexed in terms of wavelengths by the diffraction grating element 11, respectively. The respective advancing directions of the principal rays of the individual wavelength light components directed from the lens 13 to the reflecting mirrors $15_1$ to $15_5$ are parallel to the xz' plane and form fixed angles with respect to the z'-axis direction.

Each of the reflecting mirrors $15_1$ to $15_5$ acts as a first reflecting mirror which reflects its corresponding wavelength light component converged by the lens 13 and feeds thus reflected light component to the lens 13. Namely, the reflecting mirror $15_1$ has a reflecting surface at a converging position of the light component having the center wavelength $\lambda_1$ converged by the lens 13, and reflects this light component at the reflecting surface, so as to feed the light component into the lens 13. The reflecting mirror $15_2$ has a reflecting surface at a converging position of the light component having the center wavelength $\lambda_2$ converged by the lens 13, and reflects this light component at the reflecting surface, so as to feed the light component into the lens 13. The reflecting mirror $15_3$ has a reflecting surface at a converging position of the light component having the center wavelength $\lambda_3$ converged by the lens 13, and reflects this light component at the reflecting surface, so as to feed the light component into the lens 13. The reflecting mirror $15_4$ has a reflecting surface at a converging position of the light component having the center wavelength $\lambda_4$ converged by the lens 13, and reflects this light component at the reflecting surface, so as to feed the light component into the lens 13. The reflecting mirror $15_5$ has a reflecting surface at a converging position of the light component having the center wavelength $\lambda_5$ converged by the lens 13, and reflects this light component at the reflecting surface, so as to feed the light component into the lens 13.

Each of the reflecting surfaces of the reflecting mirrors $15_1$ to $15_5$ is preferably movable and curved, and preferably has a variable curvature. When used as a dispersion compensator in these cases, the optical signal processor 1 can attain a variable amount of dispersion compensation. Such reflecting mirrors $15_1$ to $15_5$ can be produced by using MEMS (Micro Electro Mechanical System) techniques, for example. Each of the reflecting surfaces of the reflecting mirrors $15_1$ to $15_5$ is not curved in the xz cross section, but is curved when seen in the x-axis direction. The respective advancing directions of the principal rays of the individual wavelength light components directed from the reflecting mirrors $15_1$ to $15_5$ to the lens 13 are parallel to the xz plane and form fixed angles with respect to the z-axis direction.

Figure 5:
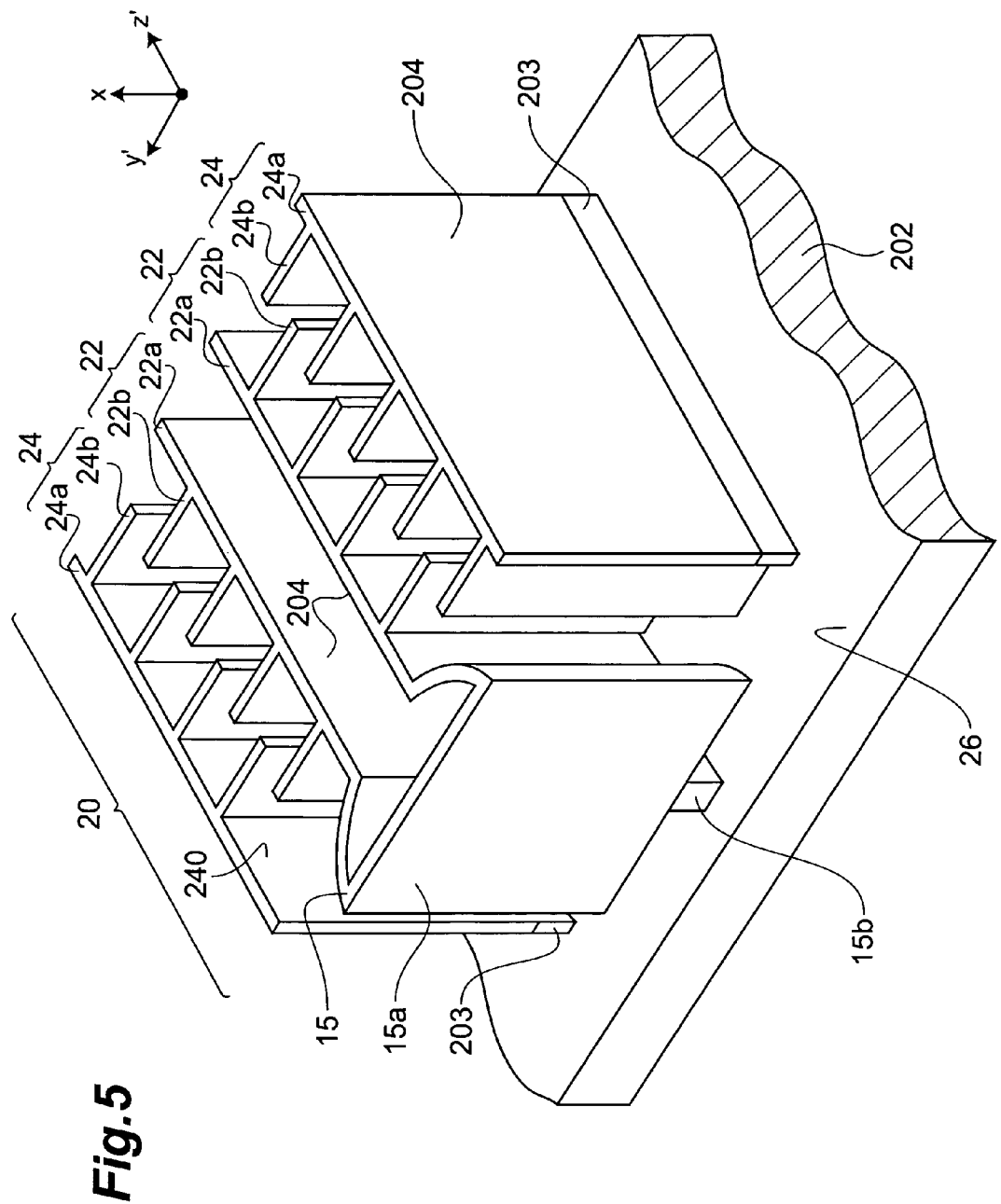
FIG. 5 is a perspective view showing a reflecting mirror and a mirror driving part for driving the reflecting mirror.

The reflecting mirrors $15_1$ to $15_5$ will now be explained in detail. FIG. 5 is a perspective view showing a reflecting mirror and a mirror driving part for driving the reflecting mirror. In the following explanation, the reflecting mirrors $15_1$ to $15_5$ may collectively be referred to as a reflecting mirror 15.

The reflecting mirror 15 is provided with a mirror driving part 20 for driving and curving the reflecting mirror 15. The mirror driving part 20 has two movable electrodes 22 connected to the rear side of the reflecting surface 15a of the reflecting mirror 15 on both sides of a direction (y'-axis direction) in which wavelengths of incident light are distributed. The mirror driving part 20 also has stationary electrodes 24 opposing their corresponding movable electrodes 22. In this embodiment, two stationary electrodes 24 are disposed on the outside of their corresponding movable electrodes 22.

Each of the movable electrodes 22 has a main part 22a disposed along a surface extending in a direction intersecting the reflecting surface 15a, whereas each of the stationary electrodes 24 has a main part 24a opposing the main part 22a. The movable electrode 22 has a plurality of fingers intersecting the main part 22a and extending toward their corresponding stationary electrode 24. The stationary electrode 24 has a plurality of fingers intersecting the main part 24a and extending toward their corresponding stationary electrode 22.

Thus configured reflecting mirror 15 and mirror driving part 20 are made by anisotropically etching a silicon substrate having a three-layer structure composed of a lower silicon layer 202, an oxidized film layer 203, and an upper silicon layer 204, for example. Namely, the upper silicon layer 204 is etched, so as to form a part of the reflecting mirror 15, movable electrodes 22, and stationary electrodes 24, and the oxidized film layer 203 is etched so as to leave the stationary electrodes 24 and a fixing part 15b. As a consequence, while the lower silicon layer 202 is used as a substrate 26, the reflecting mirror 15 and mirror driving part 20 disposed on the substrate are generated.

The stationary electrodes 24 are secured to the substrate 26 by way of the oxidized film layer 203. In the reflecting mirror 15, a part extending along the center axis (the axis extending in the y' direction) is secured to the substrate 26 by way of the fixing part 15b.

A variable voltage supply (not depicted) is connected to the movable electrodes 22 and stationary electrodes 24.

When the variable voltage supply applies a voltage between the electrodes 22, 24, an electrostatic force generated therebetween moves the movable electrodes 22 toward or away from the stationary electrodes 24. This causes the reflecting mirror 15 to curve about its center axis.

Referring to FIG. 1 again, the rectangular reflecting mirror 16 is disposed on the lens 12 side of the diffraction grating element 11, and acts as optical path turning means. Namely, the rectangular reflecting mirror 16 inputs and reflects the light arriving there by way of the optical path (incoming path) of light directed to the rectangular reflecting mirror 16 from the input port, and outputs the light by way of the optical path (outgoing path) directed to the output port from the rectangular reflecting mirror 16.

FIG. 2 is a view for explaining the reflection of light in the rectangular reflecting mirror in the optical signal processor in accordance with the embodiment of the present invention. FIG. 2($a$) shows the rectangular reflecting mirror as seen in the x-axis direction, whereas FIG. 2($b$) shows the rectangular reflecting mirror as seen in the y-axis direction. The rectangular reflecting mirror 16 as the optical path turning means has a first reflecting surface 16$a$ and a second reflecting surface 16$b$ which are orthogonal to each other. The first reflecting surface 16$a$ is parallel to the x axis and forms an angle of 45 degrees with the xz plane. The second reflecting surface 16$b$ is parallel to the x axis and forms an angle of –45 degrees with the xz plane. The rectangular reflecting mirror 16 inputs the light arriving by way of the incoming path, and successively causes the first reflecting surface 16$a$ and second reflecting surface 16$b$ to reflect the light or successively causes the second reflecting surface 16$b$ and first reflecting surface 16$a$ to reflect the light, thereby outputting thus reflected light to the outgoing path. In FIG. 2($a$), light beams at both ends in the y-axis direction of luminous fluxes inputted/outputted to/from the rectangular reflecting mirror 16 are indicated by a broken line and a dash-single-dot line. In FIG. 2($b$), light beams at both ends in the x-axis direction of luminous fluxes inputted/outputted to/from the rectangular reflecting mirror 16 are indicated by a broken line and a dash-single-dot line.

Preferably, the rectangular reflecting mirror 16 is disposed at a beam waist position of the Gaussian light beam. However, as long as the rectangular reflecting mirror 16 is disposed at a position on the left side of the diffraction grating element 11 or between the lens 13 and the diffraction grating element 11 where the rectangular reflecting mirror 16 can reflect the light reflected by the first reflecting mirrors $15_1$ to $15_5$, the effect of inverting the image of each of wavelength light components reflected by the first reflecting mirrors $15_1$ to $15_5$ can be obtained, whereby performances are not affected greatly.

In the incoming path, the light fed to the input port after being outputted from the end face of the optical fiber 90 is turned into parallel light by the lens 12. The resulting parallel light is demultiplexed by the diffraction grating element 11 in terms of wavelengths. The demultiplexed light components are converged by the lens 13. The converged light components are reflected by the reflecting mirrors $15_1$ to $15_5$. The reflected light components are turned into parallel light by the lens 13, and then are multiplexed by the diffraction grating element 11, so as to be fed to the reflecting surface of the rectangular reflecting mirror 16. From the lens 13 to the diffraction grating element 11, each wavelength light component advances in parallel with the y'z40 plane. From the diffraction grating element 11 to the rectangular reflecting mirror 16, the light advances in the z-axis direction.

In the outgoing path, the light reflected by the rectangular reflecting mirror 16 is demultiplexed by the diffraction grating element 11 in terms of wavelengths. The demultiplexed light components are converged by the lens 13. The converged light components are reflected by the reflecting mirrors $15_1$ to $15_5$. The reflected light components are turned into parallel light by the lens 13, and then are multiplexed by the diffraction grating element 11. The multiplexed light is converged by the lens 12. The converged light is outputted from the output port, so as to be fed to the end face of the optical fiber 90. The incoming and outgoing paths are the same optical path, though their respective light advancing directions are different from each other.

FIG. 1 illustrates only the respective optical paths of light components having wavelengths $\lambda_1$ to $\lambda_5$ in each of the incoming and outgoing paths. In practice, however, signal light having a wavelength $\lambda_n$ contains wavelength components in a certain band centered at the wavelength $\lambda_n$ (where n is an integer of at least 1 but not greater than 5 as in the following). Therefore, signal light having a certain band centered at the wavelength $\lambda_n$ is fed to the reflecting surface of the reflecting mirror $15_n$, and the individual wavelength light components within the band are continuously converged. Since the reflecting surface of the reflecting mirror $15_n$ is curved, when the individual wavelength light components within a certain band converged at the reflecting surface of the reflecting mirror $15_n$ are reflected, a group delay time difference occurs between a wavelength light component converged at a certain position on the reflecting surface and a wavelength light component converged at another position on the reflecting surface. By reflecting the signal light having the center wavelength $\lambda_n$ with the curved reflecting surface of the reflecting mirror $15_n$ in each of the incoming and outgoing paths, the optical signal processor 1 can adjust the chromatic dispersion of the signal light. When the curvature of the reflecting surface of the reflecting mirror $15_n$ is made variable, the amount of adjustment of chromatic dispersion can be varied.

In the optical signal processor 1, the light outputted from the end face of the optical fiber 90 is turned into parallel light by the lens 12, and thus obtained parallel light is converged by the lens 13. Therefore, each wavelength light component converged by the lens 13 is not converged at an ideal point, but into an area corresponding to the mode field diameter of the optical fiber 90 or greater in general. Hence, when the reflection of light at the reflecting surface of the reflecting mirror $15_n$ in only one of the incoming and outgoing paths is considered, even if a desirable group delay time is given to the light having the center wavelength $\lambda_n$ at the center position of the light-converging area of each wavelength light component in the reflecting surface of the reflecting mirror $15_n$, the group delay time given to the wavelength light component at a position located far from the center position within the light-converging area may differ from the desirable value.

For overcoming such a problem, the optical signal processor 1 inverts the image of each of the wavelength light components reflected by the reflecting mirrors $15_1$ to $15_5$ between the incoming and outgoing paths. FIG. 3 is a view for explaining respective reflections of light in the reflecting mirror in the optical signal processor in accordance with the embodiment of the present invention. FIGS. 3($a$) and 3($b$) explain the reflections of light in the incoming and outgoing paths, respectively. FIGS. 3($a$) and 3($b$) are views showing the reflecting mirror $15_n$ as seen in the x-axis direction. For a given single-wavelength light component in light in a certain band (having a center wavelength $\lambda_n$) reflected by the reflecting surface of the reflecting mirror $15_n$, FIGS. 3(a) and 3(b) show a principal ray C of the luminous flux, and side lines A, B on both sides of the luminous flux.

On the reflecting surface of the reflecting mirror $15_n$, light having a single wavelength is not converged at an ideal point but into a certain area. The principal ray C of the luminous flux converged by the lens 13 in the incoming path advances in parallel with the xz' plane and reaches the reflecting mirror $15_n$, whereas the principal ray C of the luminous flux reflected by the reflecting mirror $15_n$ advances in parallel with the xz' plane and reaches the rectangular reflecting mirror 16. Therefore, the principal ray C reaches the same position on the reflecting surface of the reflecting mirror $15_n$ in the incoming and outgoing paths. On the other hand, the side lines A, B of the luminous flux converged by the lens 13 in the incoming path advance while forming a certain angle with the xz' plane and then reach the reflecting mirror $15_n$, whereas the side lines A, B of the luminous flux reflected by the reflecting mirror $15_n$ advance while forming a certain angle with the xz' plane and then are made parallel to the xz' plane by the lens 13. Thereafter, the luminous flux reaches the rectangular reflecting mirror 16, and is reflected thereby while exchanging the positions of side lines A, B with respect to the principal ray, whereby the angle of the advancing direction of the side lines A, B with respect to the xz' plane in the outgoing path is inverted from that in the incoming path.

As a consequence, the positions where the side lines A, B reach on the reflecting surface of the reflecting mirror $15_n$ are exchanged between the incoming and outgoing paths. Therefore, the image I of each wavelength light component reflected by the reflecting mirror $15_n$ is inverted between the incoming and outgoing paths. Hence, errors incurred by the part other than the principal ray C in the luminous flux upon reflection by the reflecting mirror $15_n$ cancel each other out between the incoming and outgoing paths, whereby the optical signal processor 1 can reduce the processing errors.

Figure 4:
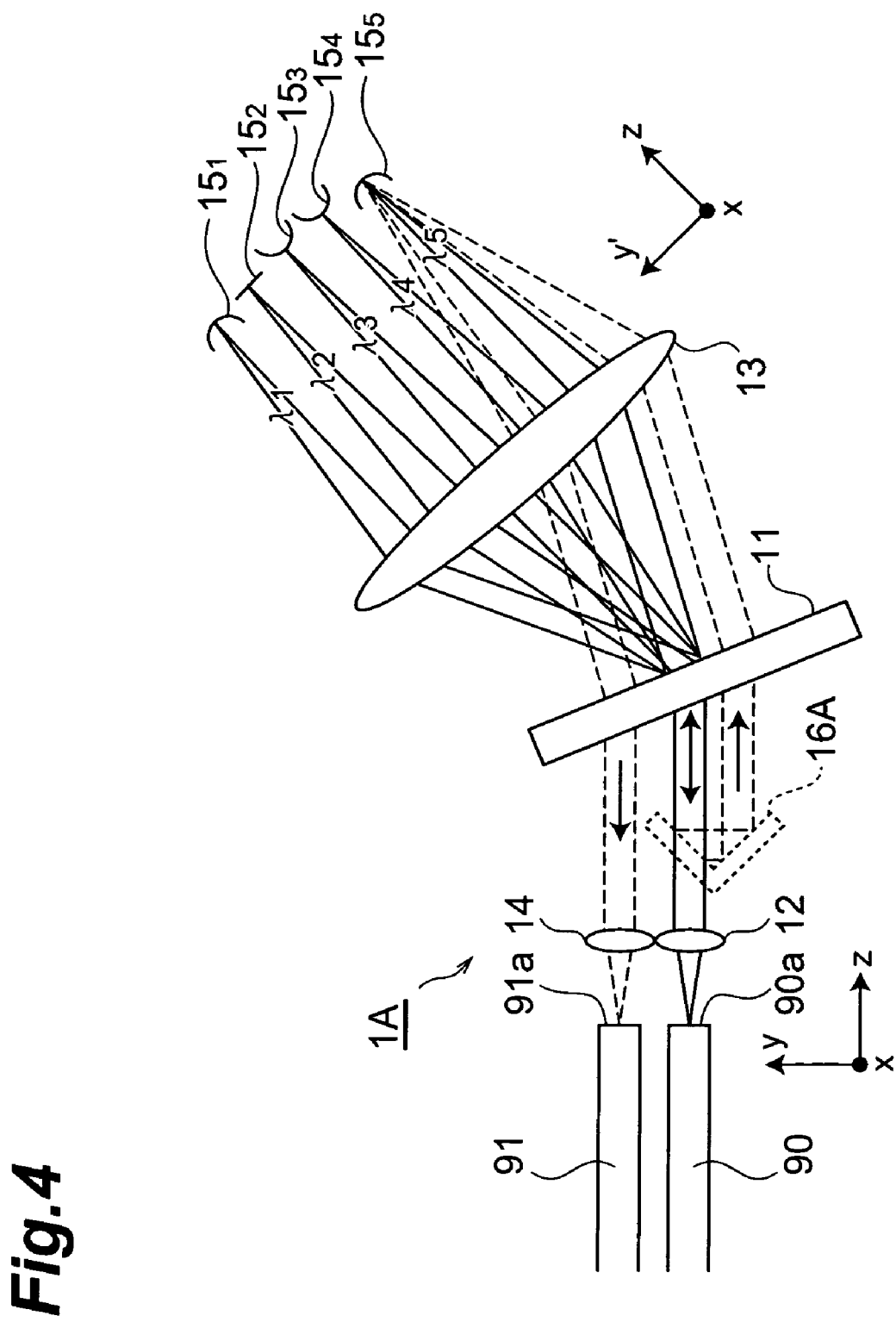
FIG. 4 is a diagram of an optical signal processor 1A in accordance with a modified example of the embodiment.

A modified example of the optical signal processor 1 in accordance with the above-mentioned embodiment will now be explained. FIG. 4 is a diagram showing the optical signal processor 1A in accordance with the modified example of the embodiment. The optical signal processor 1A shown in this drawing differs from the configuration of the optical signal processor 1 in that a rectangular reflecting mirror 16A is disposed at a position shifted in the y-axis direction from the position where the rectangular reflecting mirror 16 is disposed, and that a lens 14 is disposed between an end face of an optical fiber 91 and the diffraction grating element 11.

In the optical signal processor 1A, an input port is located at an end face of the optical fiber 90, an output port is located at an end face of the optical fiber 91, light outputted from the end face of the optical fiber 90 is fed into the input port, thus inputted light is processed according to wavelengths thereof, and the processed light is outputted from the output port, so as to be fed to the end face of the optical fiber 91. FIG. 4 shows the outgoing path for only light having a wavelength $\lambda_5$.

Since the rectangular reflecting mirror 16A is disposed at a position shifted in the y-axis direction, the incoming and outgoing paths are different from each other and parallel to each other between the rectangular reflecting mirror 16A and diffraction grating element 11, and between the optical fiber 90, 91 and the diffraction grating element 11. The light multiplexed by the diffraction grating element 11 in the outgoing path is converged by the lens 14, so as to be outputted from the output port and fed to the end face of the optical fiber 91. Thus, the optical signal processor 1A in accordance with the modified example can separate the input and output ports from each other.

Without being restricted to the above-mentioned embodiment, the present invention can be modified in various manners. For example, the rectangular reflecting mirror 16, 16A may be constituted by two planar total reflection mirrors cemented together at right angles.

Figure 6:
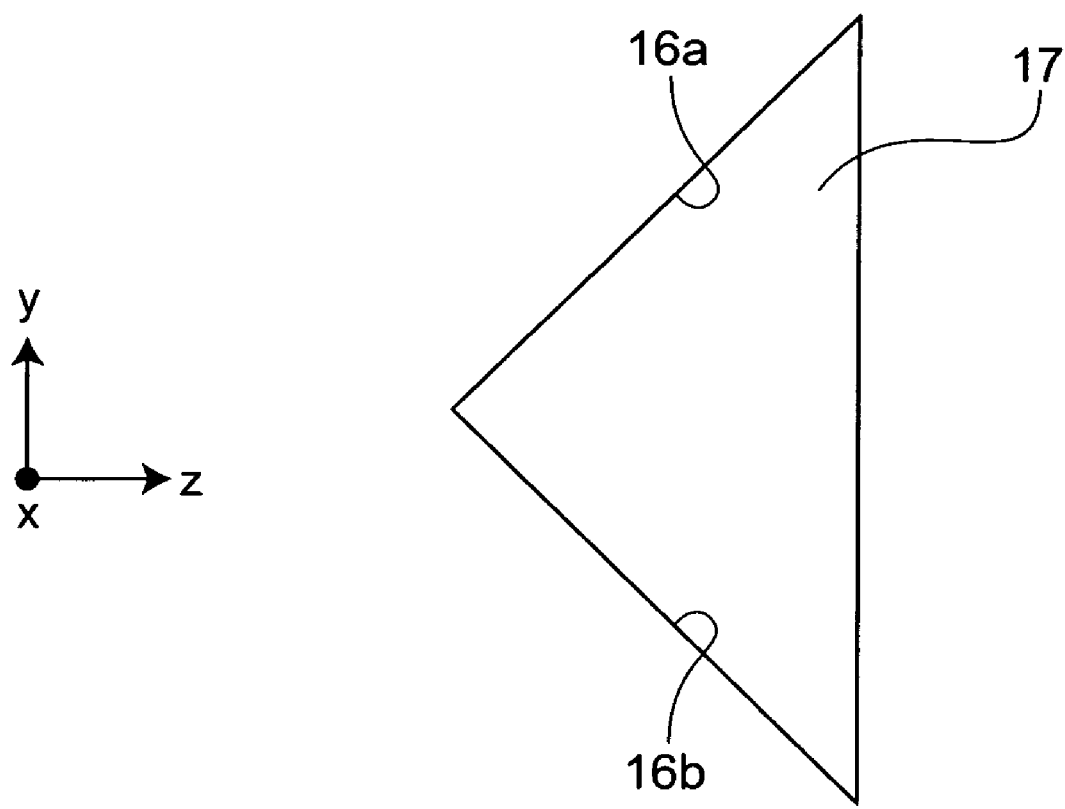
FIG. 6 is a view showing a substitute for the rectangular reflecting mirror.
Figure 7:
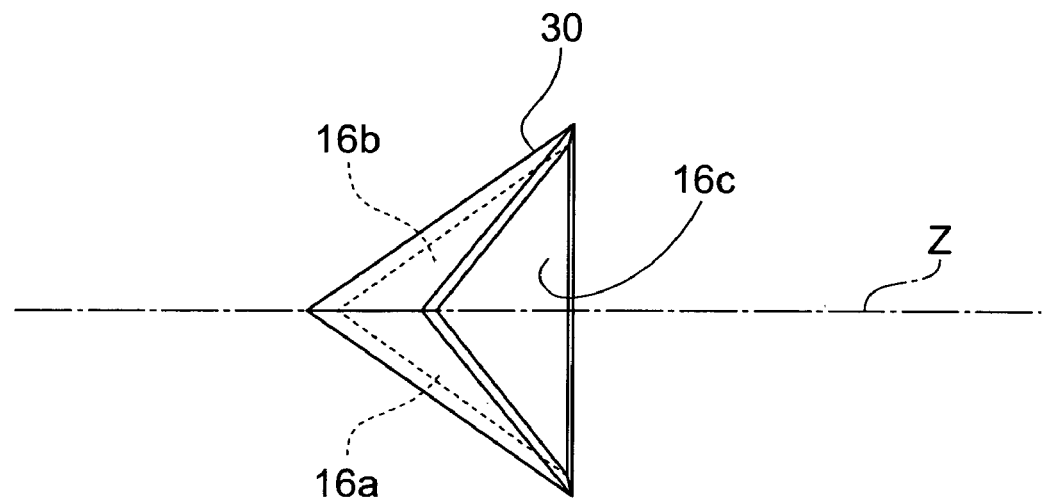
FIG. 7 is a view showing a substitute for the rectangular reflecting mirror.
Figure 8:
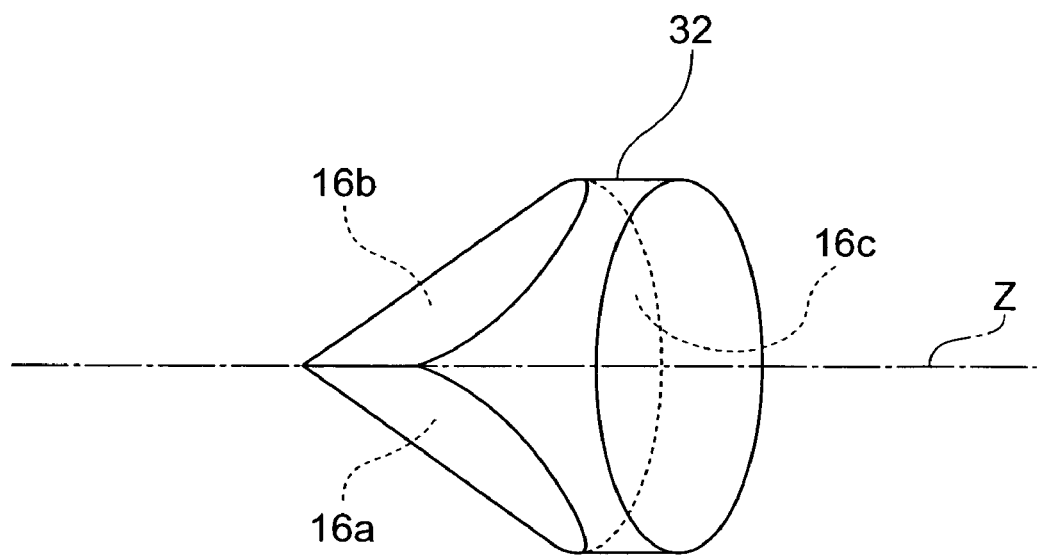
FIG. 8 is a view showing a substitute for the rectangular reflecting mirror.

FIGS. 6 to 8 are views showing substitutes for the rectangular reflecting mirror. As shown in FIG. 6, a prism 17 having two surfaces orthogonal to each other as a first reflecting surface 16a and a second reflecting surface 16b may be used as a substitute for the rectangular reflecting mirror 16, 16A.

Also, a three-surface reflecting mirror 30 in which three planar total reflection mirrors are cemented to each other at right angles as shown in FIG. 7 or a corner cube prism 32 having three surfaces orthogonal to each other as shown in FIG. 8 may be used in place of the rectangular reflecting mirror 16, 16A. In these cases, light is successively reflected by the three reflecting surfaces 16a, 16b, 16c, whereby each of the images of the respective wavelength light components on the reflecting surfaces of the reflecting mirrors $15_1$ to $15_5$ in the incoming path becomes symmetrical to that in the outgoing path about a point.

Though a transmission type diffraction grating element is used as a wavelength demultiplexer in the above-mentioned embodiment, a reflection type diffraction grating element may be used as well. Though a dispersion compensator is explained as an optical signal processor in the above-mentioned embodiment, the effect of reducing errors in processing can also be obtained when the present invention is employed in an optical signal processor in which the processing is optimized for a light component at a center wavelength in light incident on the reflecting surface of a reflecting mirror.

Figure 9:
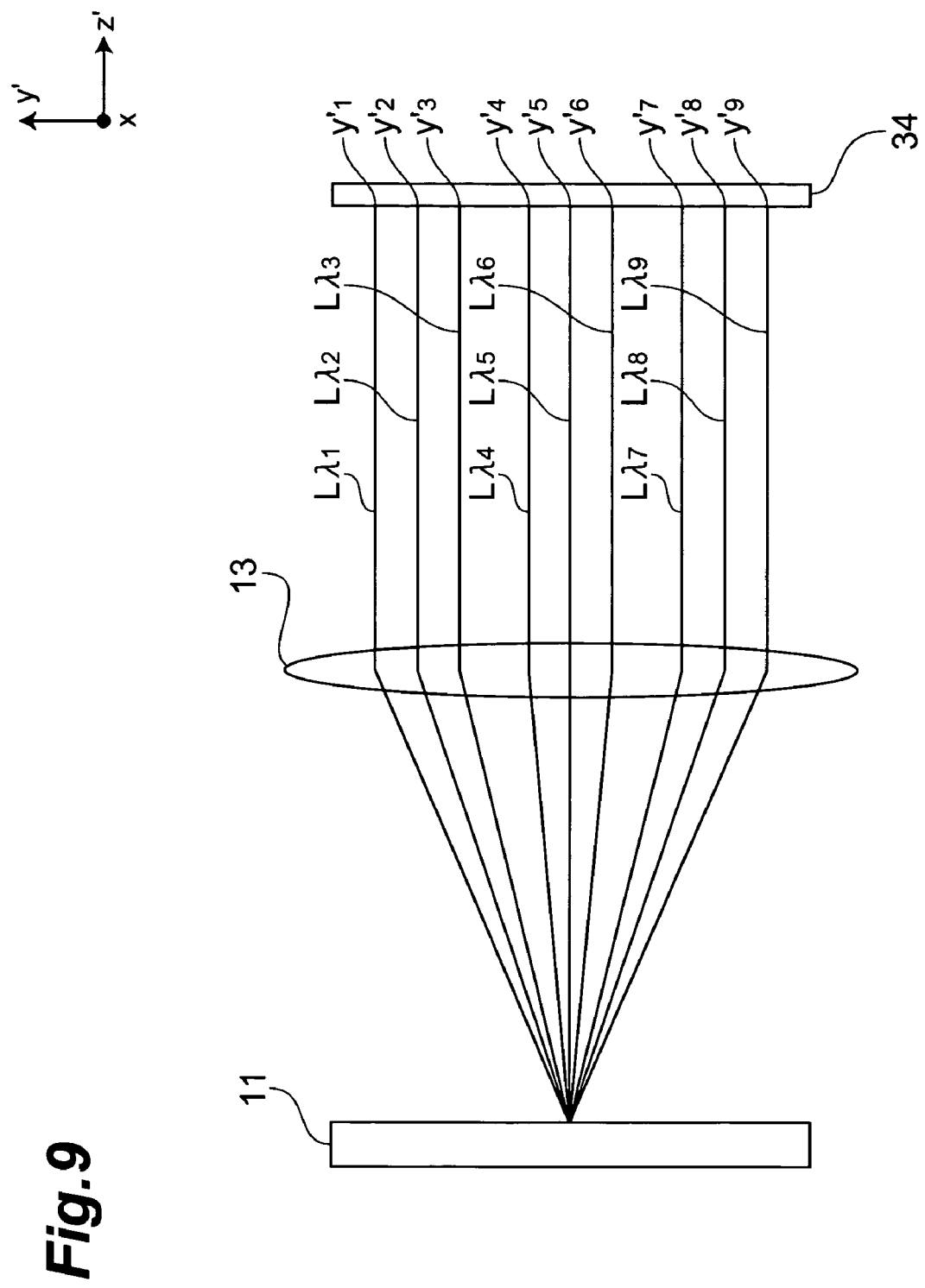
FIG. 9 is a view showing another mode of a first reflecting mirror.

FIG. 9 is a view showing another mode of the first reflecting mirror. The optical signal processor 1 may comprise the first reflecting mirror 34 shown in FIG. 9 in place of the first reflecting mirrors $15_1$ to $15_5$. On the first reflecting mirror 34, light components $L\lambda_1$ to $L\lambda_9$ having wavelengths $\lambda_1$ to $\lambda_9$ are incident at positions $y'_1$ to $y'_9$ in the y' direction, respectively.

The reflecting surface of the first reflecting mirror 34 is provided with an Au film. The thickness of the Au film varies in the direction in which wavelengths of light incident on the first reflecting mirror 34 are distributed, i.e., in the y' direction.

Figure 10:
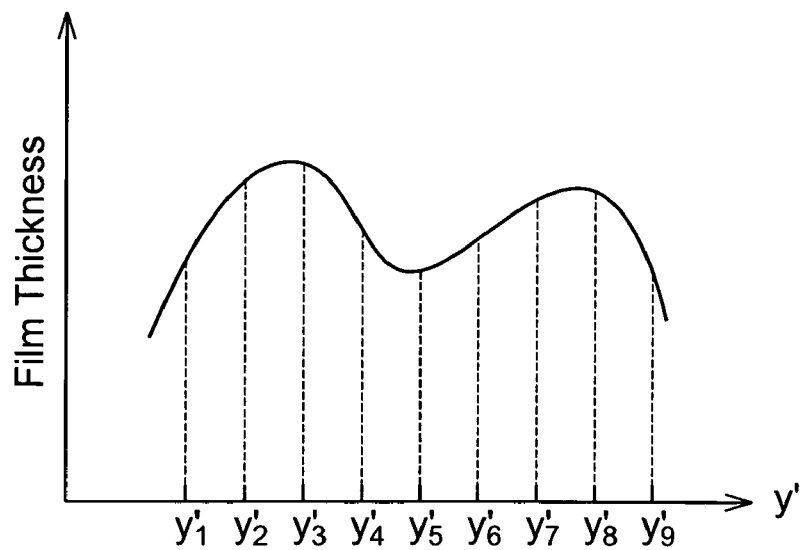
FIG. 10 is a chart showing an example of thickness distribution of an Au film.
Figure 11:
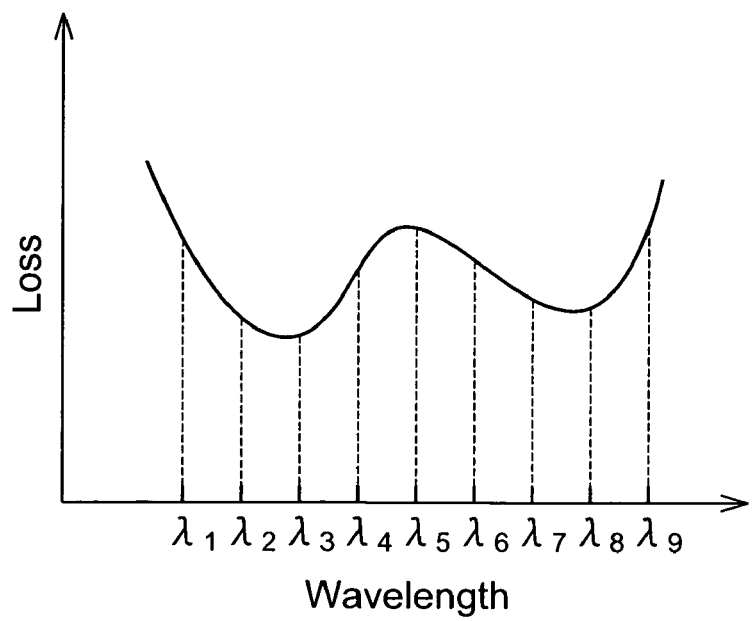
FIG. 11 is a chart showing respective losses of wavelength light components incident on the first reflecting mirror having the film thickness distribution shown in FIG. 10.

FIG. 10 is a chart showing an example of thickness distribution of the Au film. FIG. 11 is a chart showing the loss at each wavelength of light incident on the first reflecting mirror having the thickness distribution shown in FIG. 10. As shown in FIGS. 10 and 11, the thickness of an Au film and the loss of light incident on the Au film having this thickness are in inverse proportion to each other. Since the thickness of the Au film is distributed in the y' direction in the first reflecting mirror 34, each wavelength light component incurs a loss corresponding to the film thickness of Au at the incident position and then is reflected. Therefore, by appropriately setting the Au film thickness, the optical signal processor 1 equipped with the first reflecting mirror 34 can arbitrarily set the gain of light according to the wavelength.

As explained in the foregoing, the present invention can reduce processing errors even when inputting and processing light outputted from an end face of an optical fiber.

What is claimed is:

1. An optical signal processor for processing light fed to an input port according to a wavelength thereof and then outputting the processed light from an output port;

the optical signal processor comprising:
a wavelength demultiplexer for spatially demultiplexing the inputted light in terms of wavelengths and outputting demultiplexed wavelength light components into respective optical paths different from each other;
a first light-converging optical system for converging the wavelength light components outputted from the wavelength demultiplexer;
a first reflecting mirror having a reflecting surface at a position where the light components are converged by the first light-converging optical system and causing the reflecting surface to reflect the wavelength light components converged by the first light-converging optical system such that the reflected light components are fed into the first light-converging optical system; and
optical path turning means for inputting light arriving by way of the wavelength demultiplexer, first light-converging optical system, first reflecting mirror, first light-converging optical system, and wavelength demultiplexer in succession after being fed into the input port, and turning an optical path of the light such that the light travels the wavelength demultiplexer, first light-converging optical system, first reflecting mirror, first light-converging optical system, and wavelength demultiplexer in succession so as to be outputted from the output port;
wherein the optical path turning means inverts an image of each wavelength light component reflected by the first reflecting mirror between an incoming optical path from the input port to the optical path turning means and an outgoing optical path from the optical path turning means to the output port.

2. The optical signal processor according to claim 1, wherein the wavelength demultiplexer is a diffraction grating element.

3. The optical signal processor according to claim 1, wherein the reflecting surface of the first reflecting mirror is movable.

4. The optical signal processor according to claim 1, wherein the reflecting surface of the first reflecting mirror is curved.

5. The optical signal processor according to claim 4, wherein the reflecting surface of the first reflecting mirror has a variable curvature.

6. The optical signal processor according to claim 5, wherein the first reflecting mirror includes a plurality of reflecting mirrors for reflecting respective wavelength light components converged by the first light-converging optical system;

wherein the optical signal processor further comprises a plurality of mirror driving parts for driving the respective reflecting mirrors;
wherein each of the plurality of mirror driving parts comprises movable electrodes disposed on both sides of the reflecting mirror corresponding thereto in a direction in which wavelengths of incident light are distributed, the movable electrodes extending in a direction intersecting the reflecting mirror, and stationary electrodes disposed so as to face the respective movable electrodes; and
wherein each of the plurality of reflecting mirrors is fixed in a part extending along a center axis intersecting the direction, and is curved by a voltage applied between the movable and stationary electrodes.

7. The optical signal processor according to claim 1, wherein the first reflecting mirror has a reflectance arbitrarily set for each position where the respective wavelength light component converged by the first light-converging optical system is incident.

8. The optical signal processor according to claim 7, wherein the first reflecting mirror is provided with a film containing gold; and
wherein the film has a thickness set according to the reflectance set for the position.

9. The optical signal processor according to claim 1, wherein the optical path turning means inputs and reflects the light arriving by way of the incoming path, so that thus reflected light is outputted to the outgoing path identical to the incoming path.

10. The optical signal processor according to claim 1, wherein the optical path turning means has first and second reflecting surfaces orthogonal to each other, and causes the first and second reflecting surfaces to successively reflect the light arriving by way of the incoming path, so as to output the light to the outgoing path.

11. The optical signal processor according to claim 9, wherein the optical path turning means includes a prism having two surfaces orthogonal to each other as the first and second reflecting surfaces.

12. The optical signal processor according to claim 1, wherein the optical path turning means has first, second, and third reflecting surfaces orthogonal to each other, and causes the first, second, and third reflecting surfaces to successively reflect the light arriving by way of the incoming path, so as to output the light to the outgoing path.

13. The optical signal processor according to claim 12, wherein the optical path turning means includes a corner cube prism having three surfaces orthogonal to each other as the first, second, and third reflecting surfaces.

* * * * *